United States Patent

[11] 3,624,551

| [72] | Inventors | Richard A. Gudmundsen<br>Orange County;<br>James E. Rau, Anaheim, both of Calif. |
|---|---|---|
| [21] | Appl. No. | 837,249 |
| [22] | Filed | June 27, 1969 |
| [45] | Patented | Nov. 30, 1971 |
| [73] | Assignee | North American Rockwell Corporation<br>El Segundo, Calif. |

[54] SELECTIVELY TUNABLE GASEOUS LASER
8 Claims, 9 Drawing Figs.

[52] U.S. Cl. .................................................. 331/94.5,
250/199, 350/161
[51] Int. Cl. ..................................................... H01s 3/10,
H01s 3/05
[50] Field of Search ........................................ 331/94.5;
250/199; 350/161

[56] References Cited
UNITED STATES PATENTS

| 3,434,073 | 3/1969 | Forkner | 331/94.5 |
| 3,435,370 | 3/1969 | Harris et al. | 331/94.5 |
| 3,437,951 | 4/1969 | Dailey | 331/94.5 |
| 3,443,243 | 5/1969 | Patel | 331/94.5 |
| 3,453,559 | 7/1969 | Sharp et al. | 331/94.5 |

FOREIGN PATENTS

| 984,590 | 2/1965 | Great Britain | 331/94.5 |

Primary Examiner—Ronald L. Wibert
Assistant Examiner—R. J. Webster
Attorneys—William R. Lane, L. Lee Humphries, Martin E. Gerry and Edward Dugas ABSTRACT: The invention relates to a laser device which comprises in combination laser generation means including a laser cavity which has a gaseous medium in at least a portion of the cavity and which produces directed energy comprised of a group of frequency bands. Also included are apparatuses which react with the directed energy, so designed so as to avoid translation and angular rotation of the directed energy. The apparatuses provide selective tuning of the laser cavity to at least one of the frequency bands. Included are equipments for programming the apparatuses so that the laser is tuned to either one of the frequency bands, to all of the frequency bands in a predetermined sequence, or to some of the frequency bands in a random access manner. An additional component interposed in the path of the directed energy beam enables the laser beam to act as a carrier of the electrical signals provided by this additional component.

INVENTORS
RICHARD A. GUDMUNDSEN
JAMES E. RAU

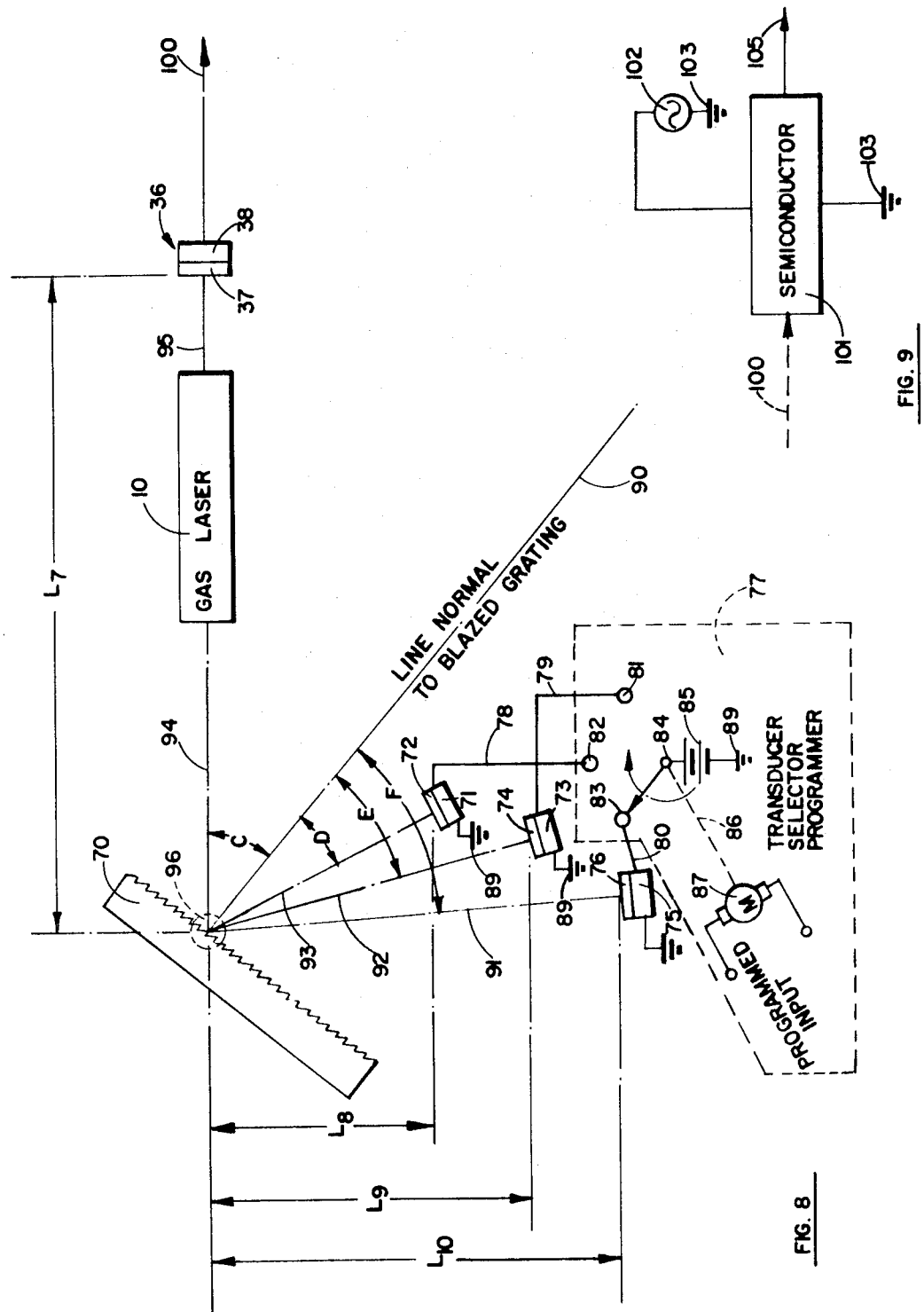

SELECTIVELY TUNABLE GASEOUS LASER

BACKGROUND OF THE INVENTION

Laser generation devices having means for tuning the laser cavity which produce directed energy of a laser beam generally cause angular rotation or translation of the laser beam while the devices are being tuned.

Further disadvantages of laser beam producing devices are that they generally produce a single frequency band and hence do not lend themselves to selective tuning to a group of frequency bands, one band at a time, sequentially or in a random-access fashion.

Further in the conventional laser generation device means for superimposing signals on the directed energy is not readily possible without translation or angular rotation of the beam.

SUMMARY OF THE INVENTION

Quantum Theory of Molecular Transitions of a Carbon Dioxide Laser Medium

Inasmuch as this invention uses a gas laser medium, discussion of the characteristic behavior of this medium in a laser device is appropriate. Reference is made to FIGS. 1, 2 and 3, wherein FIG. 1 displays the intensity of the $C_{12}O_{16}O_{16}$ isotope as a function of time of the carbon dioxide molecule which is used as a laser medium, and FIGS. 2 and 3, the spectral amplitude of this molecule is shown as a function of the number of waves per centimeter or frequency.

This $C_{12}O_{16}O_{16}$ carbon dioxide isotope is exemplary of the various isotopes usable as a gas laser medium. Examples of other isotopes of carbon dioxide which are usable as a laser medium are $C_{12}O_{16}O_{18}$, $C_{12}O_{17}O_{18}$, $C_{12}O_{17}O_{18}$ as well as other permutations and combinations of carbon and oxygen. The carbon monoxide isotope is also exemplary of the various isotopes usable as a gas laser medium. Examples of carbon monoxide isotopes are $C_{12}O_{16}$, $C_{12}O_{17}$ and $C_{12}O_{18}$ and a number of other combinations of carbon and oxygen. Other gaseous laser media may also be used.

Although the character of the spectral intensity versus time and the spectral amplitude versus frequency of the $C_{12}O_{16}O_{16}$ isotope will be discussed hereinbelow, it is understood that frequency limits and wavelength spread of other isotopes may be greater or smaller than the $C_{12}O_{16}O_{16}$ isotope and may have a different frequency and wavelength spread; these other isotopes may also be used.

Hence, it is seen from FIGS. 2 and 3 that the $C_{12}O_{16}O_{16}$ isotope will have a wavelength and frequency spectral distribution, the upper and lower plot point limits being as follows:

| wave number in waves per cm. | frequency × $10^{12}$ cycles per sec. | wavelength in microns |
|---|---|---|
| 1,087 | 32.7 | 9.2 |
| 926 | 27.8 | 10.8 |

Upon further examining the characteristics of FIG. 1, it can be seen that this FIGURE represents the 001–02°0 and the 001–100 transition states of the exemplary $C_{12}O_{16}O_{16}$ carbon dioxide isotope under discussion. The transition from the quantum state 001–02°0 to the quantum state 001–100 is the reason for the creation of R and P groups of absorption lines, shown as 75 lines in FIG. 1. Each of the lines of the time function response characteristic of FIG. 1 corresponds to a frequency band of the frequency or wave number function response characteristics of FIGS. 2 and 3. The frequency function response characteristics of the 001–100 transition is displayed in FIG. 2, while the 001–02°0 transition is displayed in FIG. 3. Each line of FIG. 1 or its corresponding frequency band or wave number of FIGS. 2 and 3 has a bandwidth of approximately 100 megacycles. It follows, that other isotopes of gaseous laser media will exhibit larger or smaller bandwidth characteristics and a larger or smaller group of spectral lines and frequency bands, dependent upon the isotope.

Hence, the natural characteristics of gaseous laser media, and particularly such media having isotopes comprised of the carbon and oxygen elements give rise to a wide group of frequency bands, each band having a relatively wide bandwidth in the transition process from one quantum state to another.

These characteristics make available a large number of frequency bands as an output from any laser device employing three isotopes. Tuning the laser device to any of the frequency bands generated, or sequentially tuning the laser device to any of the frequency bands generated or to randomly tune to these frequency bands constitute a number of options made possible by use of a gas-type laser medium of the oxygen-carbon molecule. Further possibilities exist for superimposing signals on the beam of directed laser energy by a modulator located in the path of and responsive to the directed laser beam.

The wavelength, frequency and wave number used in FIGS. 2 and 3 are given by the following relationships:

$$\lambda = c/f \quad (1),$$
$$w = 1/\lambda \quad (2),$$

where $c$ = velocity of light = $3 \times 10^{10}$ cm./sec.,
$f$ = frequency in cycles per second,
$\lambda$ = wavelength in microns, where 1 micron = $10^{-4}$ cm.,
$w$ = wave number in waves/cm.

Further details relative to energy transition levels of gaseous laser media may be found in any good textbook on quantum mechanics.

Summary

Briefly, in accordance with the invention, four different species of a directed laser beam generating device is shown in FIGS. 4–8, all having a gaseous laser medium for producing directed laser energy discharge, and means reacting with the directed energy for avoiding translation and angular rotation of the directed energy. The reacting means provides selective tuning of a laser cavity of each of the species to at least one of the frequency bands. The laser device comprises means which include the laser cavity wherein the gaseous medium is in at least a portion of laser cavity. The laser cavity, therefore, in combination with the reacting means, provides the directed laser energy and tuning capability of the laser device. The gas laser medium may be contained optionally in a laser chamber which may occupy in length anywhere from a very small portion of the laser cavity to nearly the entire laser cavity.

Objectives of the Invention

Hence, it is an objective of this invention to provide a laser device producing directed energy wherein the beam of directed energy produced will not be subject to angular rotation or to translation when being tuned.

It is a further objective of this invention to provide such a laser device capable of being selectively tuned to any of a group of frequency bands constituting the directed energy beam.

It is still a further objective of this invention to provide species of this device for enabling such selective tuning to be accomplished sequentially, in a random fashion or to provide discrete tuning constantly to one of the frequency bands.

It is yet another objective of this invention to provide means for superimposing signals on the directed energy by utilizing modulation devices or similar means in the path of the directed energy.

BRIEF DESCRIPTION OF THE DRAWINGS

FIG. 8 is a schematic view of a fourth exemplary embodiment of a laser device showing a gas laser chamber, a partially reflective means, an energy dispersive element and a group of programmable electrically activated transducers having mirrored surfaces for providing tuning to any of the frequency bands of the laser device according to the particular transducer being activated; and FIG. 9 is a schematic representation of a device generating electrical signals connected to semiconductive material, wherein the semiconductive material may be interposed in the path of the directed energy in connection with any of the four species of laser devices of FIGS. 4, 6, 7 and 8, for enabling the electrical signals to be carried by the directed laser beam of energy transmitted by any of these laser devices.

EXEMPLARY EMBODIMENTS

The First Exemplary Embodiment

Figure 4:
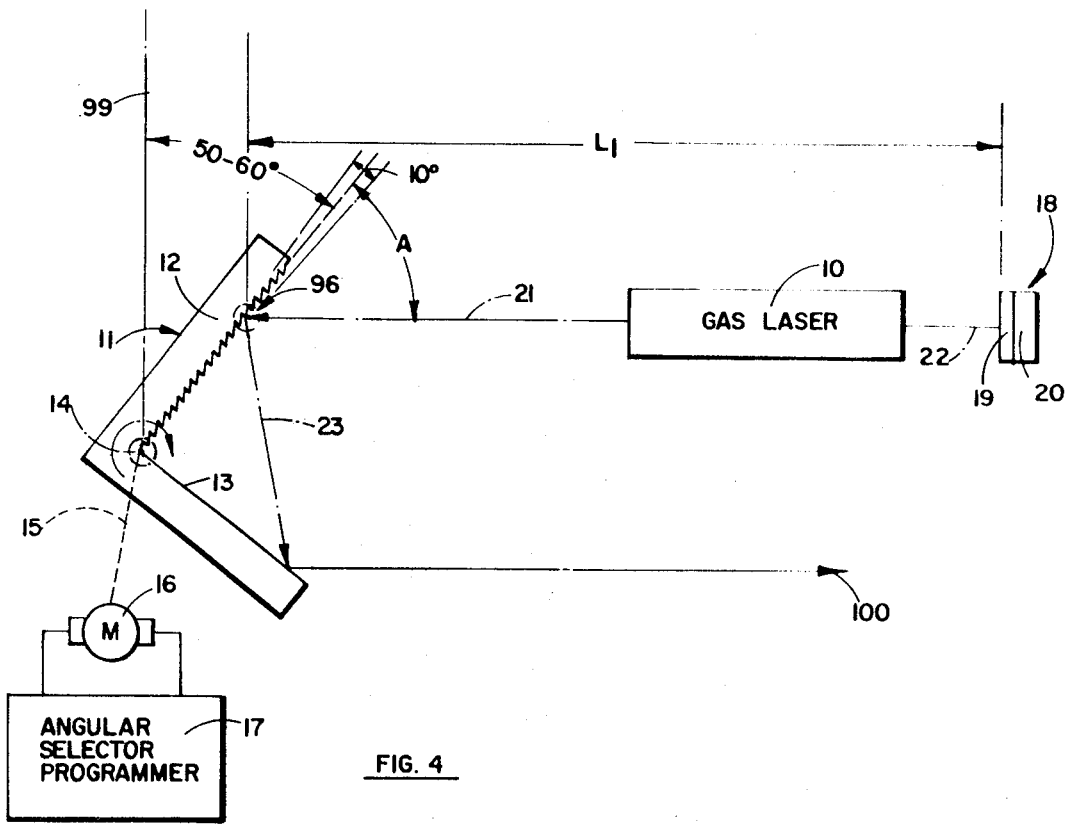
FIG. 4 is a schematic view of a first exemplary embodiment of a laser device showing a gas laser chamber, reflective means consisting of dispersive and reflective members which react with the directed laser energy and which is rotatable to produce selective tuning to any of a group of frequency bands provided by the laser device.

Referring to FIG. 4, laser chamber 10 contains $C_{12}O_{16}O_{16}$ isotope of carbon dioxide and conventional laser pumping means (not shown). Reacting means 11 comprises a rotatable energy dispersive portion 12, and reflective portion 13 substantially at right angles with respect to dispersive portion 12.

The reacting means is rotatable about pivot point 14 by means of shaft 15 of a prime mover or motor 16, shaft 15 being attached to pivot point 14. Motor 16 is electrically energized through angular selector programmer 17 which is adapted to the prime mover for positioning the reacting means so as to provide different angular orientations of the surface of the dispersive portion with respect to a laser beam directed on to that surface. Programmer 17 may provide the means by which the reacting means to be continuously rotated, or may in a predetermined sequence change the angular position of the reacting means and hence the dispersive portion so that the directed laser beam 21 forms angle A with an imaginary plane parallel to the face of the dispersive portion. Angle A will vary between 30 and 40 degrees over the range where the several frequency bands will be produced by beam portion 21. Hence an approximate band ±5° about the imaginary plane or a 10° band bisected by the imaginary plane will represent the limits over which the face of dispersive element 12 would have to be positioned to produce the frequency bands hereinabove described in connection with FIGS. 2 and 3. Outside of the ±5° variation, the laser device will not resonate to any of the frequency bands.

Mirror 18 comprising reflective portion 19 and opaque portion 20 and is positioned for reflecting portion 22 of the laser beam. Selective tuning of the laser device so as to cause resonance at any of the frequency bands hereinabove stated, will be accomplished by rotational action of the programmed reacting means. The laser beam consisting of portions 21, 22, and that portion of the laser beam within chamber 10 will be reflected back and forth at resonance over an effective electrical length $L_1$ of the laser cavity, producing standing waves. It follows therefore, that the laser cavity will include such components as dispersive means 12, gas laser chamber 10 and mirror 18, and that resonance of the laser cavity at any one of the frequency bands will be a function of angle A.

Portion 23 of the laser beam, which constitutes approximately 30 percent of the directed energy is diffused by dispersive means 12, directed to the mirrored surface of reflective portion 13, reflected therefrom and transmitted as laser beam portion 100 comprising any of the hereinabove stated frequency bands. Beam portion 100 will be maintained parallel to beam portions 21 and 22 throughout the range of the ±5° variations; during these variations selective tuning of the laser device is possible. It is also noted that beam portion 100 will not be angularly rotated or translated during the entire range of the ±5° variations, thereby making it possible to direct the laser beam accurately on to a given target without the necessity of employing complex beam redirection devices. It is noted that when angle A is varied over the approximate range of 40–50 degrees, the rotatable reacting means 11 will be positioned at an angle described by a vertical line 99 and the imaginary plane at the face of blazed grating 12, the angle ranging between 50 and 60 degrees, approximately.

It may be seen from the above description of this embodiment, that programmer 17 used herein may be adapted or programmed to provide a specific angular orientation of reacting means 11 so that the angle between line 99 and the face of the blazed grating is within the specified limits to produce one of the discrete frequency bands, the frequency bands scanned in sequential order, or the frequency bands chosen in a random access manner or in a given predetermined and programmed order to provide directed laser energy at a plurality of frequencies capable of being produced by the device without translation or angular rotation of the directed energy.

Figure 5:
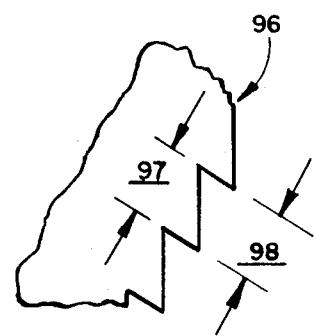
FIG. 5 is a magnification of a portion of the dispersive means used in the first and fourth exemplary embodiments showing the blaze angle of a very small area of the dispersive means.

Referring to FIG. 5, a very much enlarged view is shown at 96 of the blazed grating portion 12 of the reacting means. Therein it is seen that the face of the blazed grating constitutes a plurality of generally right-angle triangular members wherein the length of the slanted or hypotenuse-shaped portion 98 is longer than the length of the longer side 97 of the other two remaining sides. The blaze angle is defined as the angle formed by sides 97 and 98. The blazed grating provides scattering action of the directed energy so that a portion of the scattered directed energy is directed to the reflective surface of reflective portion 13 for reflection therefrom as beam 100. Stationary blazed grating 70, as used in connection with the embodiment of FIG. 8 is identical to blazed grating 12.

The Second Exemplary Embodiment

Figure 1:
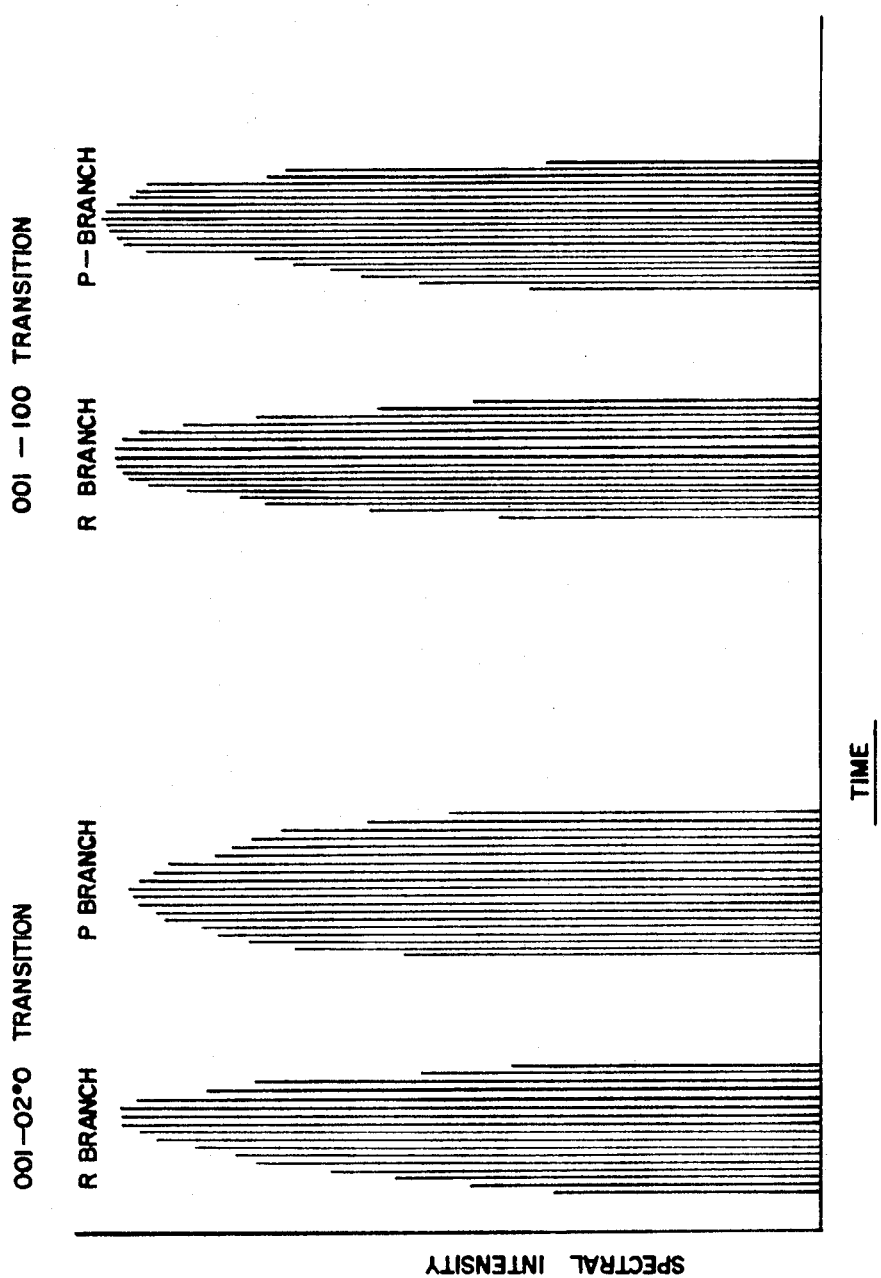
FIG. 1 is a spectral intensity diagram of the transition of the $C_{12}O_{16}O$ isotope of carbon dioxide from the 001–02°0 to the 001–100 level as a function of time and showing the 75 spectral lines comprising the R and P branches of these transition levels.
Figure 2:
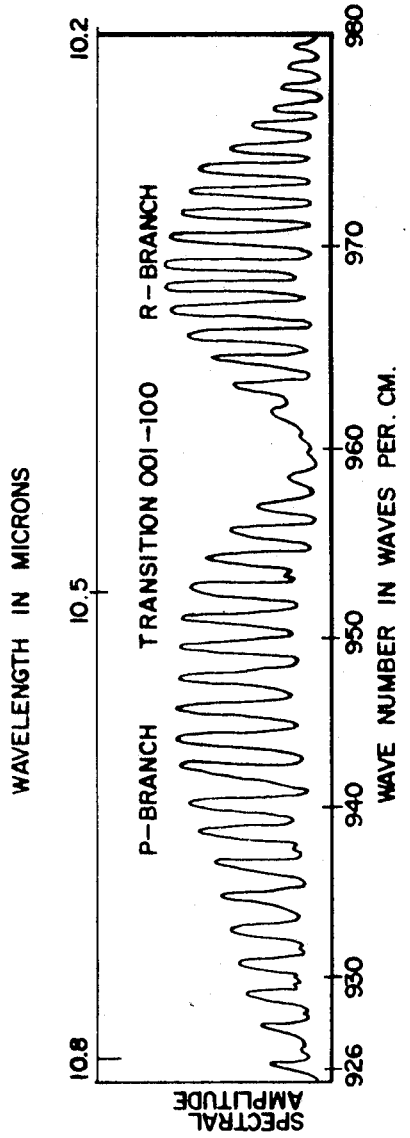
FIG. 2 is a spectral amplitude diagram of the $C_{12}O_{16}O_{16}$ isotope of carbon dioxide 001–100 energy level as a function of waves per centimeter or frequency bands comprising the R and P branches thereof and having a wavelength spread between 10.2 and 10.8 microns.
Figure 3:
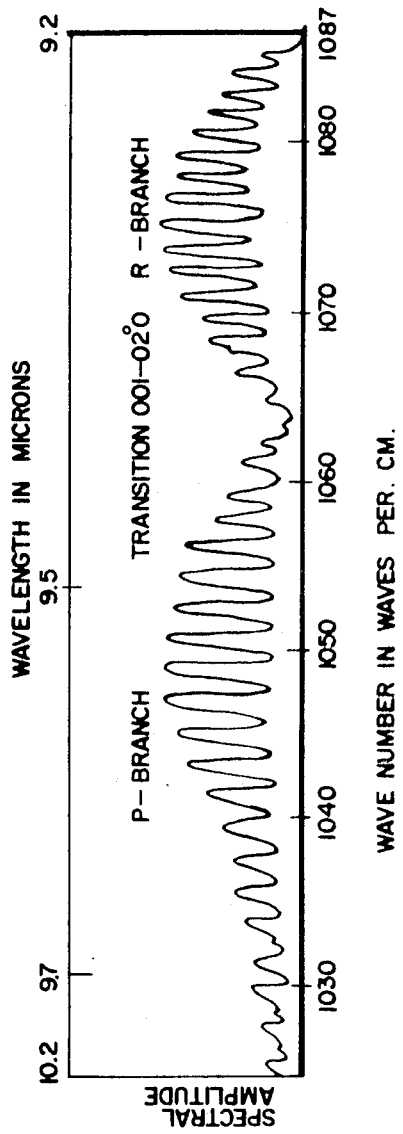
FIG. 3 is a spectral amplitude diagram of the $C_{12}O_{16}O_{16}$ isotope of carbon dioxide 001–02°0 energy level as a function of waves per centimeter or frequency bands comprising the R and P branches thereof and having a wavelength spread between 9.2 and 10.2 microns.
Figure 6:
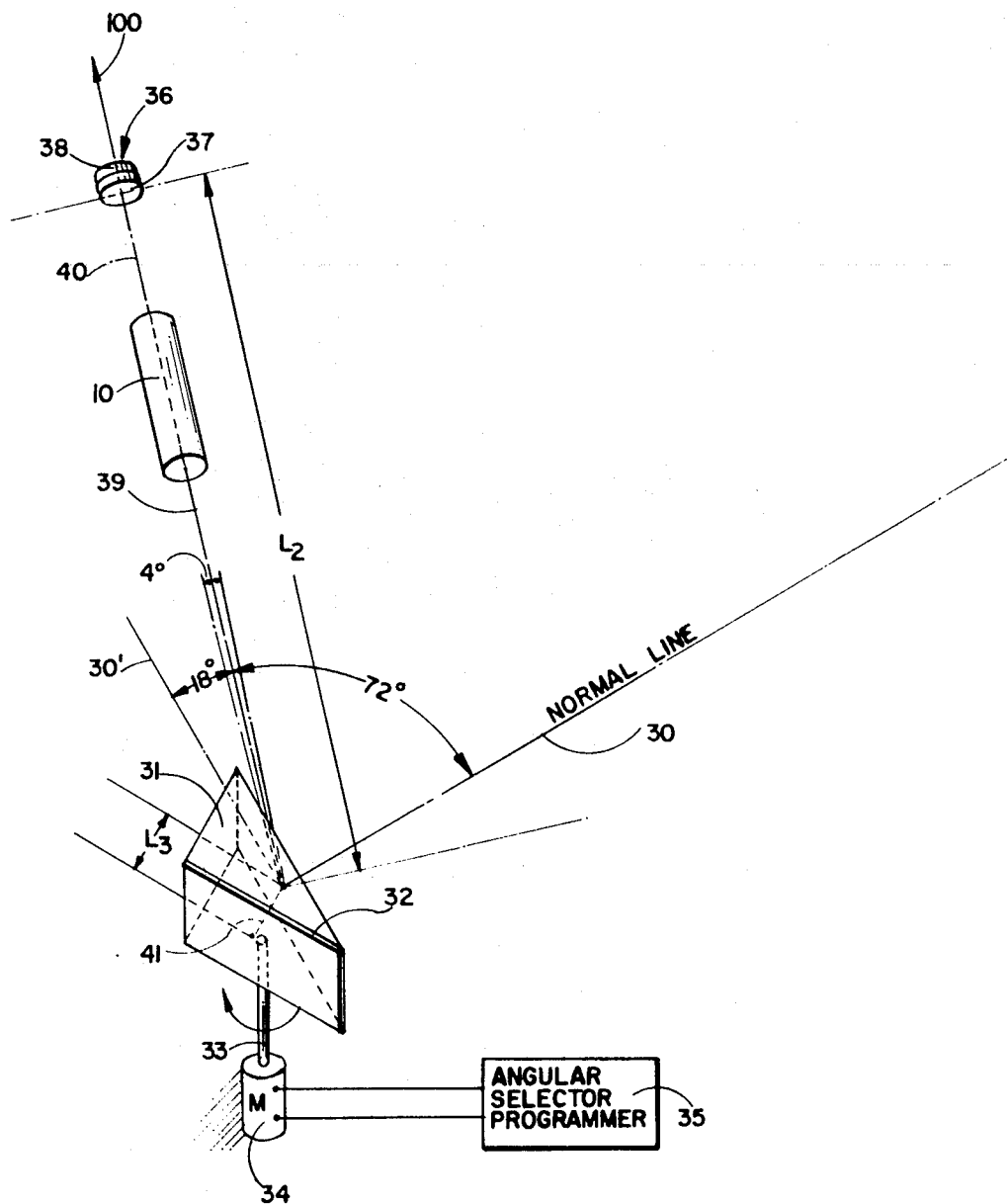
FIG. 6 is a schematic view mostly in perspective, of a second exemplary embodiment of a laser device showing a gas laser chamber, a partially reflective means, a rotatable prism for reacting with the directed laser energy to provide selective tuning to any of a group of frequency bands provided by this laser device.

Referring to FIG. 6, laser chamber 10 contains $C_{12}O_{16}O_{16}$ isotope of carbon dioxide and conventional laser pumping means (not shown). The reacting means comprises a rotatable right-angle prism 31 with a reflective coating 32 generally of gold or silver on the longer side of the two remaining sides of the prism. The prism is rotated as shown by the rotational direction arrow. Rotational action is accomplished by attaching the prism to shaft 33 of motor 34. Motor 34 is electrically connected to angular selector programmer 35, and the programmer controls the angular position of the motor for positioning the prism so as to provide angular orientation thereof with respect to the directed laser beam as desired, or to provide continuous rotation of prism 31. The reacting means or reflective prism provides optical interaction with at least a portion of directed energy 41 which is transmitted within prism 31 and reflected by surface 32. The directed laser beam is comprised of portions 39, 40, 41, and that portion internal to chamber 10. When portion 39 is impinged upon the longest surface of prism 31 and transmitted into the prism as portion 41 frequency bands as hereinabove described in connection with FIGS. 2 and 3 are produced when the portion 39 is oriented at a nominal 72° with respect to normal line 30, at the point of incidence of the portion 39 on the longest rectangular face of the prism. At that point of orientation, the prism forms an angle of 18° with respect to line 30', which is parallel to the longest edges of the prism and is perpendicular to the reflective surface 32. The frequency bands transmitted will occur over an approximate range of ±2° angular prism orientation with respect to the nominal 18° angle when the prism material is comprised of gallium arsenide. When other prism materials are used, angular orientations ranging between ±1° and ±5° are possible.

It is seen that during resonance, the effective electrical length of the laser cavity is $L_2+L_3$. Resonance or tuning of the laser device will occur in the laser cavity between mirror surface 37 of partial mirror 36 and reflective surface 32 of prism 31 over the effective cavity length $L_2+L_3$. Partial mirror 36 is comprised of mirror surface 37 having a chemical backing 38. Backing 38 may be either germanium or sodium chloride or other suitable material. Partial mirror 36 will have approximately an 80 percent reflective and a 20 percent transmittive quality. Due to the characteristics of the prism, a portion of the directed beam, beam 100, will be transmitted during the aforesaid prism positions about the nominal 18° angle, through the partial mirror without translation or angular rotation of beam 100.

It is understood that programmer 35 may be a high-speed electronic device for providing discrete positioning of the prism, sequential rotation thereof or a predetermined order of angular positioning of the prism for providing the various frequency bands hereinabove described in connection with FIGS. 2 and 3.

The Third Exemplary Embodiment

Figure 7:
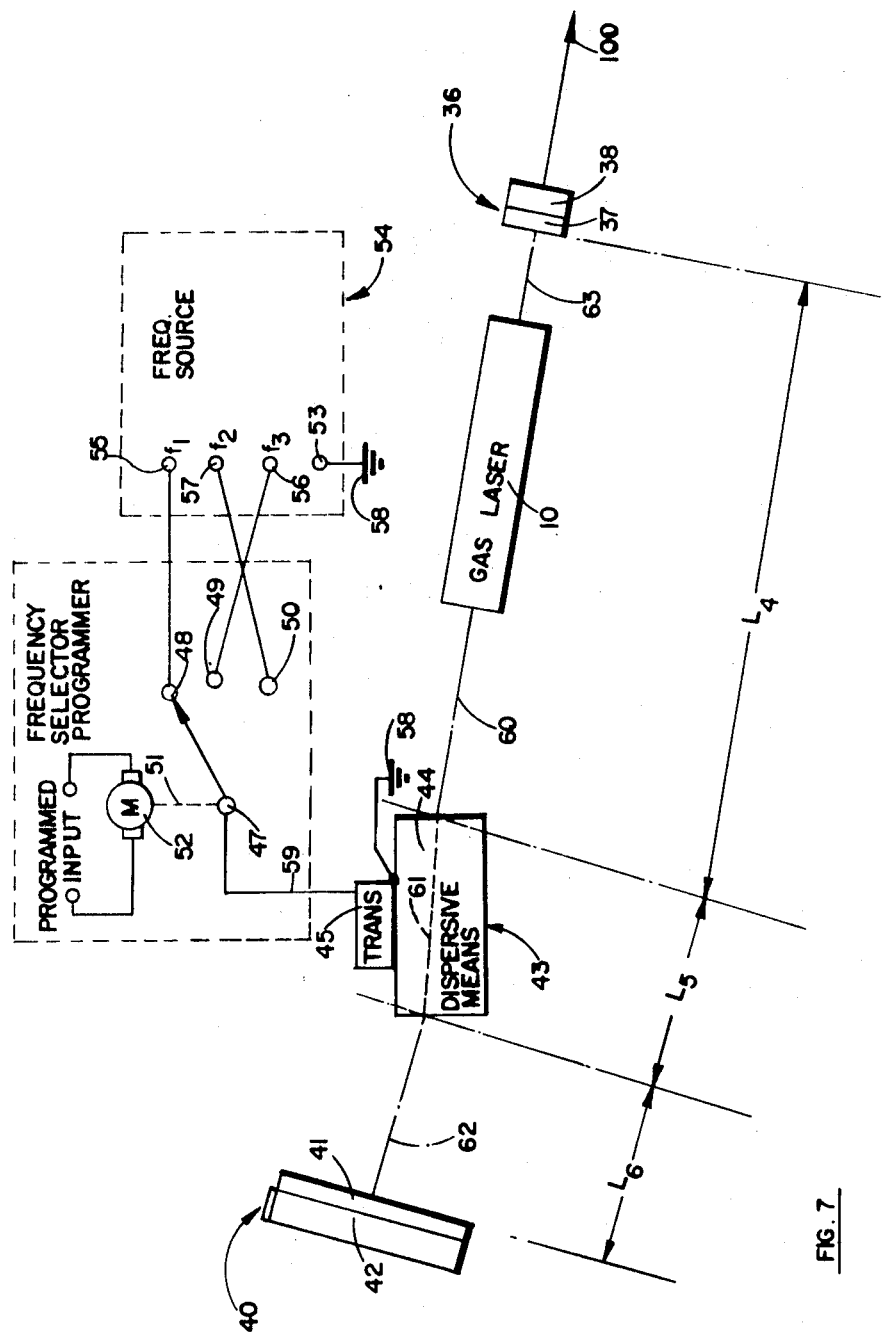
FIG. 7 is a schematic view of a third exemplary embodiment of a laser device showing a gas laser chamber, a partially reflective means, a semiconductor attached to an electrically excited transducer and a reflective surface for providing selective tuning to any of a group of frequency bands produced by this laser device.

Referring to FIG. 7, laser chamber 10 which contains the $C_{12}O_{16}$ isotope of carbon dioxide, also has a conventional laser pumping means (not shown).

Spaced apart and positioned in front of chamber 10 at one end of the laser cavity is partial mirror 36. This mirror is comprised of partially reflective surface 37, and a chemical backing 38 such as germanium or sodium chloride. Mirror 36, therefore, has the capability of transmitting 20 percent of the laser beam and reflecting 80 percent thereof.

Reacting means 40 is comprised of mirror 41 having attached thereto an opaque backing 42, and is positioned at the other end of the laser cavity.

Reacting means 43 is comprised of a dispersive means such as semiconductive material 44 adapted to electrically responsive transducer means 45 such as an acoustic transducer, by attaching the transducer means to the dispersive means. Dispersive means 44, being interposed in the path of the directed energy within the laser cavity, provides selective tuning of the laser cavity in accordance with frequencies of electric signals energizing the transducer means. To accomplish this selective tuning, transducer means 45 is electrically connected at one end thereof to ground 58, the other end of the transducer being connected by means of wire 59 to a rotatably driven member 47 of a selector switch located in a frequency selector programmer 46. The ground return side 53 of frequency source 54 is connected to ground and common signal return 58. Member 47 is attached to shaft 51 of motor 52. Motor 52 is controlled and positioned by the programmer in accordance with a predetermined program. Exemplary of the order in which different frequencies might be impressed across transducer 45 is depicted in the way the selector switch is connected to a frequency source. When terminals 48, 49 and 50 of the frequency selector programmer are respectively electrically connected to terminals 55, 56 and 57 of frequency source 54, electrical signals having frequencies symbolically stated as $f_1$, $f_3$ and $f_2$ are sequentially imposed across transducer 45. When motor 52 is programmed to be driven constantly by the programmer, the signals having frequencies $f_1, f_3$ and $f_2$, in that order, are representative of any three low-frequency signals which will be impressed across transducer 45. The laser cavity will then be tuned to three of the particular frequency bands as hereinabove discussed in connection with FIGS. 2 and 3. It may be seen from the interconnections between the programmer and frequency source that the order of the frequencies exciting transducer 45 may be accomplished by the manner in which the selector switch terminals are connected to the frequency source terminals.

Consequently, if a single of the frequency bands is desired for example, the programmer causes the selector switch to stop at a particular terminal thereof, thereby constantly interconnecting rotatable member 47 with any of terminals 48, 49 or 50 of this exemplary selector switch. In this instance, the laser is at resonance to one of the frequency bands determined by the particular frequency used to excite transducer 45, and a laser beam comprised of portion 60, portion 61 which is bent slightly by propagation through dispersive means 44, portion 62, and portion 63 will be directed through partial mirror 36, as directed energy 100. Frequency source 54 may be connected to programmer 46 so that the electrical signals across transducer 45 may be switched in an ascending or descending frequency order of the frequencies supplied by source 54. In this instance, the frequency bands produced by the laser device will be propagated in a sequential order.

Although only several frequencies were shown as being produced by source 54, it is understood that as many frequencies as required may be provided thereby. It is also understood that high-speed electronic programmers may be used instead of the electromechanical programmer illustrated.

The effective electrical length of the laser cavity of this configuration will be comprised of $L_4$, $L_5$ and $L_6$. The principle of standing waves and resonance will be the same as discussed hereinabove in connection with the first exemplary embodiment. The transducer means 45 used in this embodiment is composed generally of piezoelectrical material.

The Fourth Exemplary Embodiment

Referring to FIG. 8, laser chamber 10 which contains the $C_{12}O_{16}$ isotope of carbon dioxide also has a conventional laser pumping means (not shown). Reacting means 70 is identical to blazed grating 12 as hereinabove discussed in connection with the first exemplary embodiment is interposed in the path of the directed laser energy emanating from chamber 10 and positioned near one end of chamber 10. A partial mirror 36 identical in form and composition as used in connection with the second exemplary embodiment hereinabove described is positioned near the other end of laser chamber 10. When the laser device is at resonance to any of the frequency bands described in connection with FIGS. 2 or 3, the laser beam resonates within the laser cavity of this configuration. Laser beam portions 94 and 95 external to laser chamber 10 are within this cavity. Laser beam portion 94 forms an angle C with respect to a line 90 which is an imaginary line normal to blazed grating 70. As a result of beam 94 impinging upon blazed grating 70, diffraction of beam 94 occurs which may result in any of diffracted beams 91, 92 and 93. Piezoelectric transducer 71, which has a mirrored surface 72, piezoelectric transducer 73 which has a mirrored surface 74 and piezoelectric transducer 75 which has a mirrored surface 76 are placed at different predetermined distances from the point of diffraction of the laser beam on the blazed grating.

These transducers are connected at one end to electrical ground return 89, the other ends thereof are respectively connected by means of wires 78, 79 and 80 to terminals 82, 81 and 83 of a driven switch within transducer selector programmer 77. Rotatable member 84 of the driven switch is electrically connected to battery 85, the return side of battery 85 being electrically connected to ground 89. Rotatable member 84 is mechanically coupled to shaft 86 of motor 87. Motor 87 input terminals are programmed by programmer 77 to provide switching to a specific transducer, to provide sequential switching of transducers 71, 73 and 75, or to provide random-access switching or predetermined order switching of these transducers. Switching of any of these transducers imposes the electrical voltage of battery 85 across the particular transducer being switched, and translates the transducer a predetermined distance in space so that resonance is obtained at a particular frequency band hereinabove described in connection with FIGS. 2 and 3 so that a standing wave of laser energy in the laser cavity is obtained at the particular frequency band or at the several frequency bands in programmed order as the transducers are being switched.

Hence, it can be seen that when transducer 71 is electrically activated, the diffracted laser beam portion 93 will impinge upon mirror 72 and will be reflected therefrom at angle D with respect to normal line 90, and the effective electrical length of the laser cavity will be $L_7+L_8$. When transducer 73 is electrically activated, the diffracted laser beam portion 92 of the directed laser beam will impinge upon mirror surface 74 and be reflected therefrom at angle E with respect to normal line 90, and the effective electrical length of the laser cavity will be $L_7+L_{10}$. When transducer 75 is electrically activated, the diffracted laser beam portion 91 of the directed laser beam will impinge upon mirror surface 76 and be reflected therefrom at angle F with respect to normal line 90, and the effective electrical length of the laser cavity will be $L_7+L_{10}$.

When the laser device is tuned or resonated to any of the frequency bands described in connection with FIGS. 2 or 3, directed energy beam portion 100 transmitted through partial mirror 36 will be directed outward from the laser device without angular orientation or translation of the laser beam.

It may be seen from the above description of this embodiment, that programmer 77 used herein may be adapted to provide electrical activation of the transducers in a predetermined order, activate only one transducer, or activate the transducers in sequence to provide the resonance to the various frequencies capable of being produced by a carbon dioxide laser device as hereinabove described. It is understood that although only three transducer elements were shown in the drawing, that 75 transducers, one for each frequency band, may be used when the carbon dioxide isotope laser produces 75 different frequency bands. It is also understood that although a simple switching mechanism was shown, that a high-speed electronic switch within a high-speed electronic programmer may be used for extremely rapid switching of the several transducers utilized. The transducers used herein are generally of piezoelectric material.

Laser Devices Utilized as a Signal Carrier

Means 101 may be provided in connection with any of the four species of laser devices hereinabove described to enable any of these laser devices to act as the carrier of electrical signals.

Adaptation of device 101, generally of semiconductive material, to these laser devices is accomplished by placing device 101 in the path of laser beam 100. Semiconductor device 101 is electrically connected to one side of an electrical signal source 102. The other side of semiconductor 101 and the other side of electrical signal source 102 is connected to ground 103. Interposition of semiconductor 101 in the path of laser beam 100 causes that laser beam to penetrate through the semiconductive material thereof and exit as directed laser beam component 105. It is, therefore, seen that any of the laser devices hereinabove described which may be tuned to one of the frequency bands, sequentially tuned to all of the frequency bands or tuned in a random-access manner to some of the frequency bands as controlled by a particular programmer being used, may be used as carriers of electrical intelligence contained in source 102. The particular signal or signals superimposed upon directed beam portion 100 as provided by signal source 102 and due to interposition of semiconductor 101 in the path of beam 100 will result in the intelligence being carried by the laser beam and propagated in the form of modulated carrier 105.

We claim:

1. A laser device, comprising in combination:

means comprising an optical resonant laser cavity having an axis and a member containing a gaseous laser medium in at least a portion of the cavity along said axis and means for exciting said medium for producing directed laser output energy comprising a group of frequency bands; and reacting means, as a component of said laser cavity, and optically coupled to said member for reacting with the directed laser energy internal to said cavity and for avoiding translation and angular rotation of said directed output energy, The reacting means providing selective tuning of the laser cavity to at least one of the frequency bands, the reacting means comprising rotatable energy dispersive and reflective portions for respectively dispersing and reflecting at least a portion of the directed energy internal to said cavity to sustain oscillation and to couple said directed internal energy from said cavity by substantial total reflection for providing said selective tuning in accordance with the angular orientation of the dispersive portion with respect to the directed energy.

2. The invention as stated in claim 2, including:

a prime mover coupled to said reacting means; and a programmer coupled to said prime mover for positioning said reacting means so as to provide said angular orientation.

3. The invention as stated in claim 2, wherein:

the dispersive portion is a blazed grating for diffracting at least a portion of the directed energy internal to said cavity; and the reflective portion has a mirrored surface for reflecting said portion of the directed energy.

4. The invention as stated in claim 5, including:

means optically coupled to the directed output energy for superimposing signal means on at least one of the frequency bands.

5. A laser device, comprising in combination:

means comprising an optical resonant laser cavity having an axis and a member containing a gaseous laser medium in at least a portion of the cavity along said axis and means for exciting said medium for producing directed laser output energy comprising a group of frequency bands; and reacting means, as a component of said laser cavity, and optically coupled to said member for reacting with the directed laser energy internal to said cavity and for avoiding translation and angular rotation of said directed output energy, the reacting means providing selective tuning of the laser cavity to at least one of the frequency bands, the reacting means being a stationary dispersive means and a plurality of reflectors attached to transducers, said dispersive means optically interacting with the directed energy in the cavity and any of said plurality of reflectors for optical activation of at least one of said reflectors.

6. The invention as stated in claim 5, including:

a programmer adapted to said transducers for providing said electrical activation in a predetermined order thereby moving said transducers to predetermined locations in said predetermined order.

7. The invention as stated in claim 5, wherein:

the transducers are composed of piezoelectric material, each of the transducers having at least one mirrored surface.

8. The invention as stated in claim 2, including:

means optically coupled to the directed output energy for superimposing signal means on at least one of the frequency bands.

* * * * *